ary section of the index table
United States Patent Office 3,588,989
Patented June 29, 1971

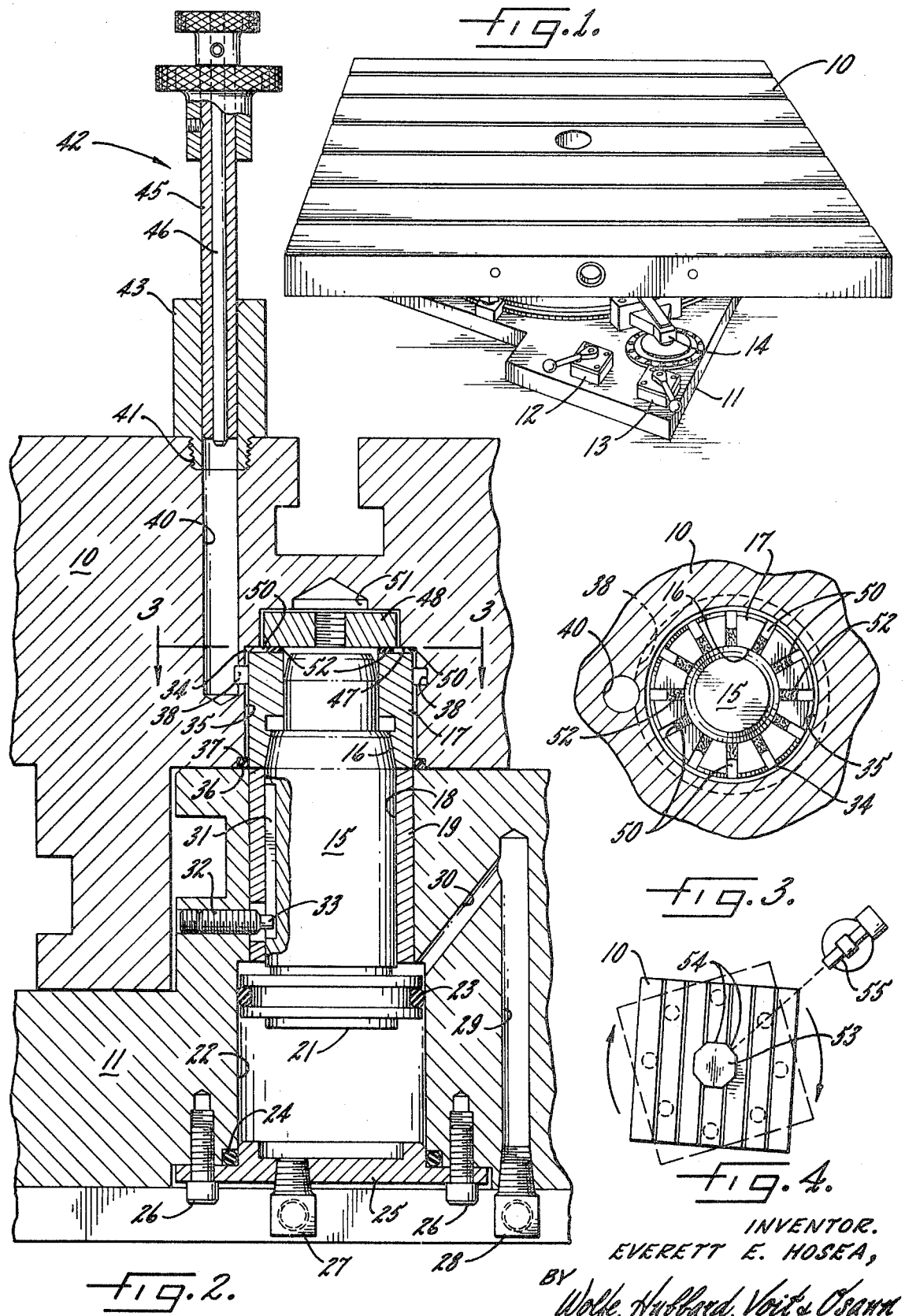

3,588,989
PRECISION LOCATING MEANS FOR MACHINE TOOLS AND METHODS OF CONSTRUCTION
Everett E. Hosea, Butte des Mortes, Wis., assignor to Giddings & Lewis, Inc., Fond du Lac, Wis.
Filed June 26, 1968, Ser. No. 740,133
Int. Cl. B23q 17/18, 3/16; B23k 37/06
U.S. Cl. 29—407                                    6 Claims

ABSTRACT OF THE DISCLOSURE

A shot pin receptacle assembly and manufacturing method are described in which a precision bushing is loosely fitted within a receptacle bore, and the elements are assembled in a precise locational relationship with the shot pin being engaged prior to retention of the bushing by injection of a hardenable cementing medium.

---

This invention relates to machine tools, and in particular to a shot pin locating means for selectively registering two movable machine elements in a precise predetermined locationol position, and a method of manufacture for such apparatus. In its principal aspect, it concerns a receptacle assembly having a loosely fitting bushing which is precisely located with respect to its shot pin prior to being secured in place with a hardenable cementing medium.

Shot pin registering means have long been used in machine tools, and in rotary index tables in particular. In brief, the shot pin mechanism consists of an axially slidable pin generally carried in the base of the table and engageable with one of a plurality of accurately located bushing bores within the underside of the rotatable table or platen. Such a shot pin assembly may be as exemplified by my co-pending application with Gordon H. Jones Ser. No. 694,465, now U.S. patent 3,465,615 entitled Precision Locating Means for Machine Tools.

Such precision index tables often require an index accuracy of three seconds of arc or less. Previous tables have used hardened and ground locating bushings which were pressed into precisely located receptacle bores in the underside of the platen. Such bores must necessarily be machined with great accuracy as to size and roundness, as well as radial and angular position. Size and roundness is of importance because distortion of the bushing when pressed into the bore must be kept to a minimum. Positional accuracy is even more difficult to obtain, with an error of plus or minus .0002 inch on each coordinate axis often being considered excessive.

A difficulty experienced during construction of rotory index tables of this type arises whenever it is found on inspection that one or more bushings are not within specified positional tolerances. The table must then be dismantled, the misplaced bushing drawn out, the bore remachined in the correct position with a larger diameter, and an oversized bushing pressed into place. This process is repeated until the required specification is met for every bushing. Such procedure is very time consuming considering that the table must be dismantled and reassembled for each inspection, and accounts in significant part for the relatively high cost of precision index tables of this type.

In view of the foregoing, it is a principal object of the present invention to provide an improved shot pin receptacle assembly for machine tools in which locating bushings may be precisely located and secured in place in a manner which eliminates the need for precisely locating the bores in which the bushings are retained. An allied object is to provide a method of manufacturing such a shot pin receptacle assembly.

It is also intended to provide a means of locating a precision bushing within a roughly located bore in which the bushing may be precisely positioned with respect to the same shot pin mechanism with which it will be associated in use, and in a manner which requires no press fits or other heavy stress-producing operations which might detract from the positional accuracy of the finished machine.

A further object is to provide such a machine tool and method of construction wherein an accidentally misplaced bushing may be easily withdrawn and repositioned without the need to perform further machining operations, and without the requirement that an oversize bushing be used to replace the one which had been incorrectly positioned.

Other objects and advantages of the invention will become apparent upon reading the following detailed description and upon reference to the drawings, in which:

FIG. 1 is a perspective of a rotary index table of the type in which the shot pin receptacle assembly of the present invention is usefully employed;

FIG. 2 is a fragmentary section of the index table of FIG. 1, illustrating a shot pin receptacle assembly embodying the present invention, and showing a means employed in connection with the invention for injecting a hardenable cementing medium into the annular clearance volume surrounding the bushing;

FIG. 3 is a section taken in the plane 3—3 of FIG. 2; and

FIG. 4 is a diagrammatic representation of the use of precision alignment means in connection with the invention.

While the invention will be described in connection with certain exemplary embodiments and procedures, it will be understood that it is not intended to so limit the invention, but it is instead intended to cover all alternative and equivalent constructions and procedures included within the spirit and scope of the invention as defined by the appended claims.

Turning to the drawings, there is shown in FIG. 1 an illustrative rotary index table embodying the invention. This table is externally of conventional design, having relatively movable elements comprising a rotatable platen 10, a fixed base 11, and having various external controls by which the table may be manipulated by the operator. In the illustrated embodiment, the controls include manually operated switches which control pneumatic pressure for operation of the shot pin locating means described herein and for clamping of the table. A switch 12 controls the pneumatic system which actuates the shot pin assembly, while a switch 13 controls a pneumatic clamping system which securely clamps the platen 10 to the base 11 during machining operations. Also visible in FIG. 1 is one of the clamping arms 14 by which the platen 10 is selectively locked to the base 11. In operation, the platen 10 and the base 11 are released for rototion by the operator through the release of the clamping arms 14, and the platen 10 may be rotated to a desired position for performing a machining operation on a workpiece not shown) secured to the platen 10 by clamps. Such machining operations are desirably performed at predetermined rotational positions without the complex task of determining each location by means of a separate measurement each time the platen 10 is shifted. For this reason the platen 10 is registerable in each of a plurality of predetermined index positions by the shot pin means described herein.

A shot pin 15 is carried in the base 11 and is selectively engageable with the internal precision locating surface 16 of a corresponding receptacle or bushing 17 in the underside of the platen 10. The shot pin 15 is fluid actuated and is slidable in a precision bore 18 formed within a hardened insert sleeve 19. The insert 19 is itself retained by a hardenable cementing medium such as epoxy resin; in one of the movable elements, in this case the base 11.

Power for actuation of the shot pin 15 is delivered by a pressure fluid actuated piston 21 sliding within a cylinder 22 and sealed by an O-ring 23 located in a suitable circumferential channel surrounding the base of the piston 21. The cylinder 22 is formed within the base 11 and is sealed by another O-ring 24. This assembly is completed by an end plate 25 secured by screws 26 or other suitable fasteners. Pressure fluid is directed into the cylinder 22 through a fitting 27 communicating with the interior of the cylinder. Another fitting 28 is provided which communicates with a bore 29 extending into the base 11. The latter bore is intersected by another bore 30 communicating with the portion of the cylinder 22 on the opposite side of the piston 21 from the opening of the first fitting 27. In this way pressure fluid may be selectively directed to either side of the piston 21 and the shot pin 15 is thereby raised or lowered as desired. To prevent rotation while permitting axial movement, an axial keyway 31 is formed in the side of the shot pin 15, and a key 32 is threaded through an adjoining bore in the base 11 so that its hardened tip 33 engages the keyway 31.

In previous index tables, the bushing 17 would have been pressed into one of a plurality of precisely located bores in the underside of the platen 10. The bores would be located by supporting the platen 10 on a rotary table and then indexing table from one station to the next by means of an optical auto-collimator and a precision polygon or like measuring equipment. The platen 10 would first be positioned in this manner, and the bore would then be cut by conventional machining operations. Succeeding bores were machined by repeating these steps. It can be appreciated that this procedure invites certain inaccuracies in the location of the bore, due among other things to inaccuracies of the pivot bearing of the table, positional changes in the rotating spindle of the machine tool used to cut the bore, and inaccuracies in the axis location and roundness of the bore after machining.

To avoid the foregoing difficulties, and as a principal feature of the invention, the bushing 17 is loosely retained to define an annular clearance volume 34 surrounding the bushing to allow it a predetermined amount of lateral freedom in which to locate itself prior to the injection of a hardenable cementing medium which then locks the bushing precisely in place. For this purpose an open-ended bore 35 substantially larger than the external diameter of the bushing 17 is cut into the underside of the platen 10 in a position corresponding to the intended position of the shot pin 15. The amount of clearance provided depends upon the accuracy with which the bore 35 is machined into the platen 10. If the bore 35 is machined in place within a predetermined known range of locational error, then the external diameter of the bushing 17 must be small enough to provide a radial clearance gap of at least this distance, or a difference in diameters between the bore 35 and the bushing 17 of at least twice this distance. In practice, it has been found that the maximum coordinate locational tolerances for the bore 35 may be on the order of ± .010 inch from the desired true location, thus making the necessary difference in diameters at least .020 inch.

At the mouth of the bore 35 there is provided a counterbore 36 containing an O-ring 37 or a like sealing means which seats against the counterbore 36. The sealing means is made resilient to enable the bushing 17 to be moved from side to side within the bore 35 without disrupting the seal provided at the bore mouth. An undercut annular notch 38 is also machined within the bore 35 to act as a channel for the liquid cement which is later injected. The notch 38 communicates with a drilled hole 40 having a threaded fitting or post 41 on the upper surface of the platen 10. An injection means 42 is used which mates with the fitting 41 and serves to inject liquid cement through the drilled hole 40 and into the clearance volume 34 surrounding the bushing 17 by way of the annular notch 38.

The injection means 42 can be any suitable device, and in the present embodiment comprises a body 43, a central plunger 45, and a small rod 46 co-axial with the plunger 45. In use, the plunger 45 is retracted and the body 43 filled with liquid cementing medium. The body 43 is attached to the fitting 41 and the plunger 45 is inserted and forced downward, thus injecting the cement through the passages 40, 38 and into the clearance volume 34 surrounding the bushing 17. The purpose of the small rod 46 is to allow the vacuum within the body 43 to be easily broken so as to allow the plunger 45 to be removed from the body 43 without disturbing the still liquid cement.

An internal axial abutment 47 is provided at the base of the socket 35 to positively seat and locate the bushing 17 in an axial direction. The shoulder 47 is preferably formed at the base of the bore 35 and the bushing 17 seats positively against it. In practice, a threaded slug 48 is inserted into the socket bore ahead of the bushing 17 so that in the event it becomes necessary to replace the bushing, the entire assembly may be withdrawn by threading a puller (not shown) into the threaded opening in the slug 48 and withdrawing the entire assembly as a unit.

Another feature of the invention resides in the provision of means whereby the operator injecting cement into the clearance volume 34 surrounding the bushing 17 is enabled to determine by feel when the clearance volume is substantially filled with cement. This is achieved by providing a plurality of radial grooves 50 in the seating surface of the bushing 17 where it abuts the shoulder 47. The grooves thus define a constricted opening through which the cementing medium may be caused to flow, but only at a relatively higher pressure for a rate of flow similar to that experienced in filling the clearance volume 34. Starting with an empty clearance volume 34, the operator begins to inject liquid cementing medium by means of the injection means 42 through the drilled hole 40 and the annular slot 38 and into the clearance volume 34. During this portion of flow, a substantially constant pressure is felt by the operator during injection of the cement at a substantially uniform flow rate. However, when the relatively thick, viscous cement reaches the restricted opening provided by the grooves 50 the pressure required to maintain a uniform flow rate increases sharply, thus giving the operator a sensible indication of when the clearance volume 34 is filled. Any extra cement which may enter the grooves 50 prior to the time that the injection ceases is harmlessly received within a supplementary clearance volume 51 which receives the loosely fitting slug 48. During the injection process any air which may be within the system is ejected ahead of the cement through the grooves 50, presenting no appreciable resistance to flow.

In order that cement may be prevented from flowing into the interior of the bushing 17 where it may interfere with engagement of the shot pin 15, the slug 48 is preferably pre-assembled to the bushing 17 by means of a cementing medium similar to that used to retain the bushing 17 itself. This medium accumulates in pockets 52 within the grooves 50, thus closing off the grooves from communication with the interior of the bushing and forcing the excess cement to flow upward into the supplementary clearance volume 51.

In practicing the invention, the platen 10 and base 11 are first completely machined and assembled, with the socket bores 35 being located within a known range of tolerance as previously described. The bushings 17 are each loosely supported in their socket bores 35 by the frictional support of the O-ring 37, or alternatively by other means, such as a capscrew (not shown) extending through the slug 48 and having threaded engagement with the platen 10.

With the table thus assembled, the platen 10 is first rotated on its base 11 to its first index station with the required degree of final precision. This initial station can be represented by the alignment of some locating means on the base 11 and platen 10 such as a key or slot (not shown). The initial alignment may be accomplished by means of relatively simple equipment, such as a precision dial indicator, and serves as a base line from which succeeding index stations are determined.

With the platen 10 thus located, the internal clamps are applied by means of the actuating means 14, and the shot pin 15 is actuated to shift into engagement with the first bushing 17. Since the bushing is free to move laterally within its socket bore 35, it will become centered on the pin 15 and become precisely located in a position corresponding to the first index station.

With the first bushing 17 so located, the liquid cementing medium is injected into the clearance volume 34 surrounding the bushing 17. This cementing medium may be of any suitable type, but it has been found that an accelerated epoxy resin having a pot life of approximately six minutes is most suitable. This cement is commonly supplied in liquid form in two separate containers, which are mixed just prior to use. The plunger 45 of the injection means 42 is removed and an appropriate quantity of cement is poured into the housing 43. The plunger 45 is replaced and the cement is injected by hand into the hole 40 to fill clearance volume 34 surrounding the bushing 17. As previously described, the flow of cement through the drilled hole 40 and annular slot 38 into the clearance volume 34 will cause air to be exhausted through the grooves 50 by way of the space surrounding the slug 48. When the relatively viscous cement reaches the grooves 50, the sudden build-up of back pressure is detected by the operator and the injection of cement is terminated. The pin 46 is removed, allowing the plunger 45 to be withdrawn, and the injection apparatus 42 is moved to the next bushing location.

The platen 10 is now rotated to bring the next index station into position over the shot pin 15. The pin 15 is engaged as before, and the platen is then precisely located at its second index position. This is done in practice by means of a device known as an auto-collimator 53 (FIG. 4). Briefly, this device includes a precision polygon mounted by pilot means at the center of the platen 10, and having a precisely ground flat surface 54 corresponding to each index station of the table. An optical sight 55 is mounted in a fixed position relative to the base 11 to pick up or read the reflective surfaces of the polygon to indicate alignment at each index station. This technique is well known and commonly practiced in the art.

When the platen 10 has been located in the second index position as described above, it is again clamped by means of the clamping means 14 and the process of cement injection is repeated to set the second bushing 17 with respect to the shot pin 15 in its precise locational position. The injection means 42 is then moved on to the next bushing station, and when the cement has hardened the platen 10 is shifted to the next index position. After all of the index positions have been similarly treated, any sunken or unfilled portions of the drilled holes 40 are preferably filled with cementing medium and finished off to present a neat appearance.

It will be observed that with the method of the present invention, misalignment of a particular bushing 17 due to an error in positioning during the injection or hardening of the cementing medium, may be easily remedied. The platen 10 is disassembled from the base 11 and the misaligned bushing 17 is removed by means of the threaded slug 48 as previously described. The remaining cement is then cleaned out. The same bushing is then re-inserted, being retained as before by its O-ring 37. The table is reassembled and the platen 10 is precisely positioned in the correct location, whereupon cement is re-injected in the same way as done previously. When the cement has hardened, the table is ready for use. In like manner, a worn or damaged bushing can be easily removed and a new bushing installed, should the need arise.

I claim as my invention:

1. A method for locating a bushing precisely defining an index station in a first machine tool element for selective engagement with a shot pin locating means in a second relatively movable machine tool element comprising the steps of forming an open-ended bore in the first element in a position corresponding to the intended position of the bushing within a predetermined range of bore locational error, inserting a bushing in the bore, said bushing having an internal precision locating surface adapted to receive the shot pin means and an external diameter smaller than the bore by at least twice the maximum bore locational error, assembling the machine elements with the bushing loosely retained in the bore to define an annular clearance volume, shifting the shot pin means into engagement with the bushing locating surface while the first machine element is retained at the precisely defined index station, and injecting a hardenable liquid cementing medium into the clearance volume and allowing the cementing medium to harden prior to withdrawal of the shot pin.

2. A method for locating a plurality of bushings defining index stations in a first machine tool element for selective engagement with a shot pin locating means in a second relatively rotatable machine tool element comprising the steps of forming a plurality of open-ended bores in the first element, each in a position corresponding to a particular indexing station of the second element, within a predetermined range of bore locational error, inserting a bushing in each bore, said bushings each having an internal precision locating surface adopted to receive the shot pin means and an external diameter smaller than the bore by at least twice the maximum bore locational error, assembling the machine elements with the bushings loosely retained in their respective bores to define a plurality of annular clearance volumes capable of receiving a cementing medium, aligning the relatively rotatable elements at a first index station, shifting the shot pin means into engagement with the locating surface of the bushing in the bore of the first station, injecting a hardenable liquid cementing medium into the clearance volume of the said bushing, removing the shot pin means from the cemented bushing after the cement has hardened, shifting the first element relative to the second element to bring a succeeding bushing into approximate alignment with the shot pin means, accurately positioning the elements at a precise angular displacement from the starting position by means of precision measuring equipment thereby defining a second index station, shifting the shot pin means into engagement with the adjacent bushing, injecting a hardenable liquid cementing medium into the clearance volume, allowing the cementing medium to harden and removing the shot pin means from the cementing bushing, and repeating the steps of the last foregoing paragraph until all of the bushings have been so positioned and retained.

3. A method for locating a bushing and a first machine tool element with respect to a shot pin locating means in a a second relatively movable machine tool element, comprising the steps of forming an open-ended bore in the first element in a position corresponding to the intended position of the shot pin means of the second element within a predetermined range of bore locational error, the bore having a supplemental clearance volume, and an annular clearance volume separated from the clearance volume by a restrictive opening, inserting a bushing in the bore, said bushing having an internal precision locating surface adapted to receive and position the shot pin means and an external diameter smaller than the bore by at least twice the maximum bore locational error.

inserting a sealing means between the bushing and the open end of the bore, assembling the machine elements with the bushing loosely retained in the bore to define an annular clearance volume, shifting the shot pin means into engagement with the bushing locating surface while the machine elements are retained in a precisely determined intended locational position, and injecting a hardenable liquid cementing medium into the clearance volume until an increase in flow resistance is encountered due to the filling of the annular clearance volume and subsequent flow of cementing medium into the supplemental clearance volume through the restrictive opening, terminating the injection of the cementing medium upon encountering the increase in flow resistance, and allowing the cementing medium to harden.

4. A method for locating a bushing according to claim 1, including the step of inserting a sealing means between said bushing and said bore at said open end of the bore.

5. A method for locating a bushing according to claim 1, including the step of forming the bore with a supplemental clearance volume separated from the annular clearance volume by a restrictive opening.

6. A method for locating a plurality of bushings according to claim 2, including the step of clamping said first machine tool element and said second machine tool element into said first index station prior to injecting said hardenable liquid cementing medium into said clearance volume.

References Cited

UNITED STATES PATENTS

| | | | |
|---|---|---|---|
| 2,397,626 | 4/1946 | Shriver | 264—269 |
| 2,787,175 | 4/1957 | Schurger | 77—64 |
| 3,332,133 | 7/1967 | Rye | 29—156.5 |
| 3,212,181 | 10/1965 | Henle | 29—468 |
| 1,865,808 | 7/1932 | Abegg | 29—434X |
| 2,089,795 | 8/1937 | Hodge | 29—465 |
| 2,705,375 | 4/1955 | Foreman | 33—174 |
| 3,097,434 | 7/1963 | Diamond | 33—181 |
| 3,150,550 | 9/1964 | Berlin | 29—465X |
| 3,257,720 | 6/1966 | Siler | 29—464 |
| 3,357,091 | 12/1967 | Reissmueller | 29—471.1X |
| 3,264,941 | 8/1966 | Miraglia | 90—11 |

WAYNE A. MORSE, Jr., Primary Examiner

U.S. Cl. X.R.

29—434, 467, 471.5, 559